Jan. 9, 1968  W. R. FOSTER  3,362,473
WATERFLOOD ACHIEVING HIGH MICROSCOPIC
SWEEP EFFICIENCY
Filed June 28, 1965
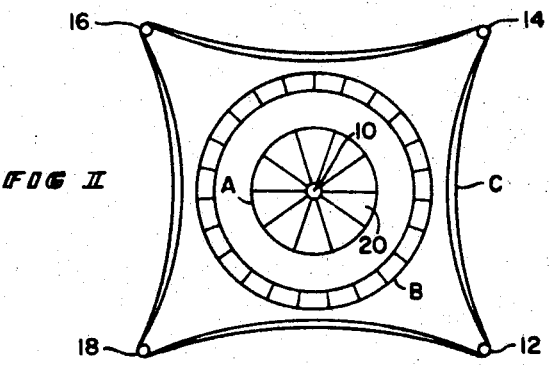
FIG I
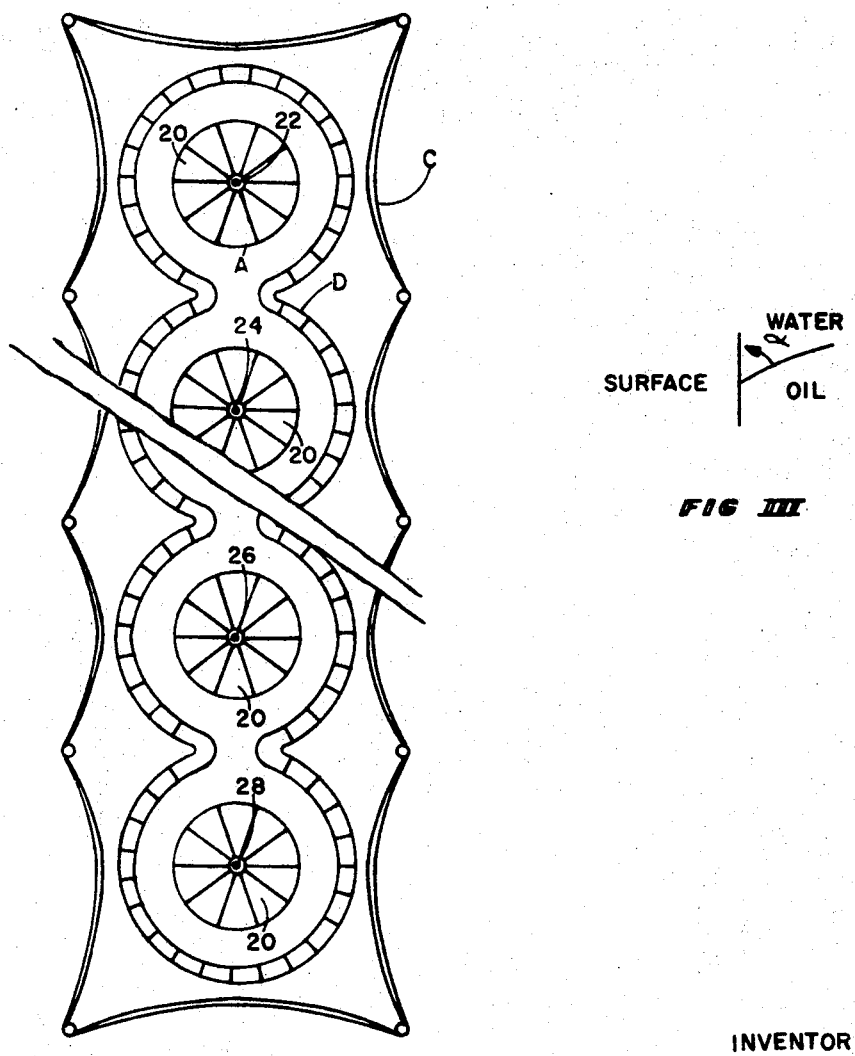
FIG II
FIG III
INVENTOR
WILLIAM R. FOSTER
BY James C. Faile
AGENT United States Patent Office 3,362,473
Patented Jan. 9, 1968

3,362,473
WATERFLOOD ACHIEVING HIGH MICROSCOPIC SWEEP EFFICIENCY
William R. Foster, Dallas, Tex., assignor to Mobil Oil Corporation, a corporation of New York
Filed June 28, 1965, Ser. No. 467,381
20 Claims. (Cl. 166—9)

ABSTRACT OF THE DISCLOSURE

This specification discloses an improvement, in a method of recovering oil from a subterranean formation in which flooding water is injected through an injection well and into the formation and oil is produced through a production well from the formation, characterized by injecting through the injection well into and flowing within the formation a selected aqueous solution under conditions such that its dimensionless displacing number is at least $2 \times 10^{-5}$, and preferably $3 \times 10^{-3}$, during flow through a significant portion of the formation. The displacing number is defined as:

$$\mu_s V_s / \sigma_{o-s}$$

where:
$\mu_s$ is the viscosity of the aqueous solution,
$V_s$ is the darcy velocity of the aqueous solution, and
$\sigma_{o-s}$ is the interfacial tension between the aqueous solution and the oil it contacts within the formation.

These displacing numbers are significantly greater than heretofore effected in waterflooding. Waterflooding at these high displacing numbers throughout a significant portion of the formation recovers significantly greater quantities of oil than prior waterflooding processes.

---

This invention pertains to recovery of petroleum from a subterranean formation. More particularly, the invention pertains to recovery of petroleum contained in a subterranean formation by flooding the formation with water.

The petroleum, more commonly called crude oil or simply oil, accumulated in subterranean formations is recovered or produced therefrom through wells, called production wells, drilled into the subterranean formations. A large amount of the oil is left in the subterranean formations if produced only by primary depletion, i.e., where only initial formation energy is used to recover the oil. Where the initial formation energy is inadequate or has become depleted, supplemental operations, often referred to as secondary recovery operations, are employed. In the most successful and most widely used of these operations, a fluid is injected through injection means, comprising one or more injection wells, and passed into the formation. Oil is displaced within and is moved through the formation, and is produced from production means, comprising one or more production wells, as the injected fluid passes from the injection means toward the production means. In a particular recovery operation of this sort, water is employed as the injected fluid and the operation is referred to as a waterflood. The injected water is referred to as the flooding liquid, or flooding water, as distinguished from the in-situ, or connate, water.

Waterflooding is a very useful method of recovery but suffers, primarily, from two disadvantages. The first is its relatively poor microscopic displacement of the oil from within the interstices of the subterranean formation. The microscopic displacement may be expressed as microscopic sweep efficiency, which is defined in percent as the ratio of the amount of oil displaced from the pore space of the portion of the formation through which the flooding liquid has passed, to the original amount of oil therein. The relatively poor microscopic displacement is due to the property of immiscibility which the water, as the flooding liquid, has with the oil it seeks to displace. There is a relatively high interfacial tension between the water and the oil, and in some cases, an unfavorable contact angle made by the interface between the two liquids with the solid surface. Where the flooding liquid is miscible with the oil within the formation, i.e., miscible flooding, these conditions do not occur. Hence, conventional waterflooding does not achieve a microscopic sweep efficiency as high as does miscible flooding. It is generally conceded that although it may otherwise have disadvantages in particular formations, miscible flooding achieves the maximum microscopic sweep efficiency possible for any given formation.

The second disadvantage is known as premature breakthrough. Premature breakthrough is defined as the production of the injected water at a production well before the oil displaced from within the formation ahead of the waterflood has been produced. Premature breakthrough reduces the areal or macroscopic sweep efficiency of the waterflood in proportion to the degree of prematurity. The primary causes of premature breakthrough are permeability stratification and the tendency of the more mobile flooding water to "finger" through a subterranean formation containing less mobile oil and thus to bypass substantial portions thereof. By fingering is meant the developing, in the floodfront, of unstable bulges or stringers which advance toward the production means more rapidly than the remainder of the floodfront. The fingering produces nonuniform injection and flow profiles.

Accordingly, it is an object of the invention to provide a method of enhancing the microscopic sweep efficiency of a waterflood used to recover oil from a subterranean formation.

Particularly, it is an object of the invention to provide a method of carrying out a waterflood which achieves a microscopic sweep efficiency approximating that of a miscible flood.

It is another object of the invention to provide a method of alleviating premature breakthrough of a waterflood.

Further objects and attendant advantages of the invention will become apparent from the following description.

In accordance with the invention, there is provided an improvement in a method of recovering oil from an oil-containing subterranean formation wherein an aqueous flooding liquid is injected through injection means into the formation and oil is produced from the formation through production means. The improvement comprises injecting into the formation an aqueous solution and flowing this solution through the formation under such conditions that its displacing number is at least $2 \times 10^{-5}$.

By displacing number is meant the pure number given by the equation:

$$N_d = \frac{\mu_s V_s}{\sigma_{o-s}} \quad (1)$$

where:
$N_d$ is the displacing number,
$\mu_s$ is the viscosity of the aqueous solution,
$V_s$ is the darcy velocity of the aqueous solution, and
$\sigma_{o-s}$ is the interfacial tension of the aqueous solution with the oil.

The displacing number, being a pure number, is dimensionless. Accordingly, the units in which $\mu_s$, $V_s$, and $\sigma_{o-s}$ are expressed must be consistent in order that they will cancel each other. Typically, units for the terms may be as follows:

$\mu_s$—poise or gram per centimeter-second,
$V_s$—centimeter per second, and
$\sigma_{o-s}$—dyne per centimeter or gram per second$^2$.

I have found that when an aqueous solution is flowed through a formation under conditions such that its displacing number is at least $2 \times 10^{-5}$, an improved recovery of oil is obtained. With flow of the aqueous solution through the formation under such conditions, an enhanced microscopic sweep efficiency is obtained. The flow of the aqueous solution under such conditions apparently effects a greater displacement of the oil within the interstices of the formation. Also, in achieving a displacing number of at least $2 \times 10^{-5}$, particularly as a result of increasing the viscosity of the aqueous solution as discussed hereinafter, premature breakthrough is alleviated.

Further, when the aqueous solution is flowed through the formation under conditions such that its displacing number is greater than $2 \times 10^{-5}$, the microscopic sweep efficiency is correspondingly greater. However, when flowed under conditions such that its displacing number is as high as $3 \times 10^{-3}$, the aqueous solution achieves a microscopic sweep efficiency approximating that of a fluid miscible with the in-situ oil. Thus, it is preferred that the aqueous solution be flowed through the formation under conditions such that its displacing number is at least $3 \times 10^{-3}$. Even higher displacing numbers may be employed. However, ordinarily, the increased cost in achieving a displacing number much higher than $3 \times 10^{-3}$ does not provide a commensurate increase in microscopic sweep efficiency.

The invention will now be described in greater detail.

In the drawings:

FIGURE 1 is a plan view of a five-spot pattern illustrating diagrammatically an embodiment of the invention.

FIGURE 2 is a plan view of a line drive illustrating an embodiment of the invention.

FIGURE 3 is a cross-sectional view illustrating the contact angle made by the interface between oil and water on a surface which is preferentially water wettable.

Attainment of the desired displacing number is effected by mutual control of the three factors, each in view of the other, set forth in Equation 1 above, defining the displacing number. Attainment of a desired viscosity of the aqueous solution is effected by employing a thickening agent for the water employed in the aqueous solution. Attainment of a desired interfacial tension between the aqueous solution and the formation oil is effected by employing a surfactant in the aqueous solution. For any given viscosity and interfacial tension of the aqueous solution, a desired displacing number can be attained by control of the velocity at which the aqueous solution is passed through the formation.

In the practice of the invention, there is selected a minimum displacing number which it is desired the flooding aqueous solution will attain under normal operating conditions during the waterflood. The selection is made from the standpoint that the displacing number should be at least $2 \times 10^{-5}$ and preferably at least $3 \times 10^{-3}$. Next, there is selected a range of darcy velocities which are achievable during the waterflood. Particularly, the highest minimum darcy velocity $V_s$ which will be achieved is selected.

By darcy velocity is meant the velocity $Q/A$ of the aqueous solution as employed in the Darcy equation of flow through porous media, where Q is the volumetric rate of injection and A is the area perpendicular to the direction of flow at the point where $V_s$, the darcy velocity, is desired to be obtained. Since actual flow occurs only through the pore space and not the entire area A, the darcy velocity, $V_s$, is smaller than the actual fluid velocity. The darcy velocity is sometimes referred to as macroscopic velocity or apparent velocity. A discussion of the darcy velocity concept is given, under the terms of macroscopic velocity and of apparent velocity, both for a radial or cylindrical development and for a spherical development, by John C. Calhoun, Jr. in his Fundamentals of Reservoir Engineering, University of Oklahoma Press, Norman, Okla. (1955), pp. 75 et seq.

The minimum darcy velocity selected may be an estimation based upon a general engineering comparison of the particular formation with other subterranean formations. In most subterranean formations, injecting water at an injection pressure at or near the pressure at which the formation fractures will achieve minimum darcy velocities with normal well patterns, as illustrated in FIGURE 1 and FIGURE 2, in the range of from about $3.5 \times 10^{-5}$ to about $3.5 \times 10^{-4}$ centimeters per second. Thus, from a comparison of the pressure drawdown or pressure build-up data obtained during the normal testing of wells completed in the particular subterranean formation with similar data obtained in other subterranean formations a minimum darcy velocity within this range may be estimated.

Greater accuracy may be obtained in the selection of the highest attainable minimum darcy velocity by determining the maximum rate of injection Q and dividing by the maximum area A which the expanding body of aqueous solution will achieve.

Any of the known methods of determining the maximum rate of injection are satisfactory. For example, the maximum rate of injection may be calculated from an extrapolation of pressure drawdown or pressure build-up data obtained during the normal testing of the well proposed as the injection well. Alternatively, a more accurate determination of Q may be made by determining, empirically, the sustained rate of injection of the aqueous solution, or, as a satisfactory approximation of water which will generate an injection pressure which closely approaches the pressure which will cause excessive fracturing of the oil-containing formation.

The maximum rate of injection may be increased by localized fracturing around the injection well. On the other hand, creation of major fracture channels will result in a nonuniform injection profile; and fracturing to a degree providing interconnecting fractures between an injection well and a production well cannot be tolerated. Any localized fracturing should be completed before empirical data are obtained as outlined above to determine the maximum rate of injection.

The area A of the expanding body of aqueous solution is very small initially, attains a maximum at somewhat beyond the midpoint between the injection well and the production well, and begins to decrease again as the developing floodfront departs from an expanding sphere or an expanding cylinder because of the steep pressure gradients near the production well. Employing the usual reservoir engineering methods, the area A may be calculated for the particular well pattern to be used, and employed to calculate both the range of darcy velocities and, particularly, the highest minimum darcy velocity achievable.

Then, an aqueous solution is chosen such that the ratio of its viscosity to its interfacial tension with the in-situ oil, taken in conjunction with the selected darcy velocities, will afford the selected displacing number. Thus, for example, any aqueous solution chosen will have the ratio of its viscosity to its interfacial tension with the in-situ oil at least within the range of from 0.057 to 0.57 seconds per centimeter, depending upon a minimum darcy velocity selected within the range of $3.5 \times 10^{-5}$ to $3.5 \times 10^{-4}$, mentioned before, to achieve a displacing number of at least $2 \times 10^{-5}$. It is preferred, however, that the aqueous solution chosen have the ratio of its viscosity to its interfacial tension with the in-situ oil in the range of from 8.5 to 85.7 seconds per centimeter, again depending upon the minimum darcy velocity selected, in order to achieve a displacing number of at least $3 \times 10^{-3}$.

In addition to having the ratio of its viscosity to its interfacial tension in the desired range, the aqueous solution which is chosen will preferably have a viscosity low enough to be flowed in the subterranean formation and yet high enough to restrict its mobility to a value no greater than the mobility of the oil within the subterranean formation.

The relationship between the mobility of the aqueous solution and the mobility of the the oil in a particular formation is related to their respective viscosities according to the following mobility ratio equation:

$$\frac{M_s}{M_o} = \frac{\mu_o}{\mu_s}\left(\frac{K_s}{K_o}\right) \qquad (2)$$

where:

$M_s$ is the mobility of the aqueous solution in the formation, $M_o$ is the mobility of the oil in the formation, $\mu_o$ is the viscosity of the oil, $\mu_s$ is the viscosity of the aqueous solution, $K_s$ is the relative permeability of the formation to the aqueous solution in the presence of any oil which remains after passage of the aqueous solution, and $K_o$ is the relative permeability of the formation to the oil in the presence of the connate water.

As indicated by Equation 2, the mobility of the aqueous solution is reduced by increasing the viscosity of the aqueous solution. With the mobility of the aqueous solution no greater than the oil within the formation, a favorable condition known as stability of flow is achieved. This stability of flow minimizes fingering and alleviates premature breakthrough. It keeps the oil, which has been displaced from the formation by the aqueous solution, flowing through the formation at the same velocity as the aqueous solution. Thus, maximum recovery of oil for any given displacing number is obtained.

Aqueous solutions employed as the flooding liquid in the invention may be Newtonian liquids, shear hardening liquids, or shear thinning liquids. A Newtonian liquid has a viscosity which is not dependent upon the rate of shear. However, a shear hardening liquid has a region of shear rates in which the viscosity increases with increasing shear rate. Conversely, a shear thinning liquid has a region of shear rates in which the viscosity decreases with increasing shear rate. Accordingly, for selecting the aqueous solution, a determination of its viscosity under flowing conditions in the subterranean formation will be most meaningful.

Any known method for making this determination may be employed. For example, the viscosity may be calculated, employing Darcy's equation for flow through porous media, from the pressure differential required for a given rate of flow through a core sample taken from the formation. On the other hand, from a practical standpoint, an engineering approximation of the viscosity of an aqueous solution under flowing conditions in the formation will be satisfactory.

An engineering approximation of the viscosity under flowing conditions in the formation of an aqueous solution considered for use may be made using a Couette-type viscometer employing concentric cylinders having relative rotation with respect to each other. With this type of viscometer, the rate of shear can be controlled. To simulate the low rate of shear experienced at the minimum darcy velocity, the rate of shear employed in measuring the viscosity should be low. For example, when employing a Brookfield Synchro-Lectic LVT Couette-type viscometer employing concentric cylinders having external and internal radii of 1.2573 centimeters and 1.3805 centimeters, respectively, the rate of shear should be from 0.1 to 10 reciprocal seconds. In most instances, suitable shear rate for determining the viscosity of the aqueous solution is that obtained at one reciprocal second.

Similarly, in selecting the aqueous solution to be employed as a flooding liquid, measurement of its interfacial tension with oil taken in the formation is most meaningful. Any known method may be employed for measuring interfacial tension. Where the interfacial tension is low, the method employing a modified sessile drop apparatus is suitable. The modified sessile drop apparatus is a conventional sessile drop apparatus except that a suitably calibrated magnifying optical instrument is employed to measure the dimensions of the small drops which form at low interfacial tensions. In making measurements of interfacial tension, it must be taken into consideration that the interfacial tension of an aqueous solution with oil approaches an equilibrium value with time. Thus, in making these measurements, care must be taken that the equilibrium value has been established.

The aqueous solution selected with respect to its viscosity and interfacial tension with the oil in the formation to provide the desired displacing number within the range of darcy velocities achievable is injected into the formation. The rate of injection is controlled so that the darcy velocity of the aqueous solution as it passes through the formation to the production means is great enough to achieve the desired displacing number. For each portion of the formation between the injection means and the production means in the path of flow of the aqueous solution, an improvement in the recovery of oil will be obtained where the desired displacing number is attained. Preferably, however, in order to obtain maximum improvement in recovery of oil, other conditions being equal, the aqueous solution should be flowed under such conditions that the desired displacing number is attained for the entire distance between the injection means and the production means. On the other hand, conditions of operation may be such that the attainment of the desired displacing number may not be practical for the entire distance. In any case, the aqueous solution should be flowed through the formation at the desired displacing number along the path of flow of the aqueous solution for a significant portion of the distance between the injection well and the production well.

The term "significant portion," as employed in the preceding paragraph, is employed in its usual sense. Thus, it is used to signify a portion of the formation which is large enough to have a substantial effect on the total amount of oil recovered from the formation. This portion of the formation is distinguished from the portion of the formation which is lying within a few feet of an injection well and which is insufficiently large to have any significant effect on the total amount of oil recovered from the formation. While high darcy velocities, and thus high displacing numbers, are achievable in these few feet because of high local pressure gradients, these few feet generally comprise less than 1 percent of the distance along the path of flow of the aqueous solution from the injection means to the production means and contain less than about 1 percent of the oil in a commercial oil well pattern. In contrast, "significant portion" is used to denote greater than about 10 percent of the distance along the path of flow of the aqueous solution from the injection means to the production means.

The aqueous solution may be passed into the formation in a sufficient volume to occupy the entire path of flow between the injection means and the production means. Stated otherwise, the aqueous solution may be introduced into the formation in an amount of 100 percent pore volume of the formation. However, because of economic consideration, a lesser amount of the aqueous solution may be employed. Additionally, because the pressure required to pass, at the requisite darcy velocities, the aqueous solution through the formation in an amount to occupy the entire path of flow between the injection means and the production means may be excessively high, a lesser amount of the aqueous solution is desirable. Accordingly, the aqueous solution may be injected into the formation in the form of a slug and the slug driven through the formation to the production means by a driving fluid such as ordinary floodwater.

As the slug of aqueous solution passes through the formation, it tends to become dissipated by portions thereof remaining in the formation and not advancing through the formation with the remainder of the slug. While the use of a slug of any size will effect improved recovery of oil, maximum recovery, other things being equal, will be obtained where the slug is of such size that it will pass through the formation from the injection means to the production means without becoming completely dissipated. Where the slug has a volume equivalent to at least 1 percent pore volume of the formation in the path of flow between the injection means and the production means, the slug will ordinarily maintain its unitary character. It is preferred, however, that the volume of the slug should comprise about 5 percent pore volume of the formation. If desired, the volume of the slug may be even higher. However, the volume of the slug ordinarily need not be greater than about 20 percent pore volume of the formation.

The use of a slug of aqueous solution followed by a driving fluid is also desirable from the standpoint of reducing the pressure required at the injection means to maintain the desired darcy velocity of the aqueous solution as it is flowed through the subterranean formation toward the production means. The pressure drop through a formation caused by flow of a slug of aqueous solution, designated $\Delta P_s$, is proportional to the product of viscosity $\mu_s$ and the natural logarithm of the ratio of the outer effective radius $R_1$ of the leading edge of the slug to the inner effective radius $R_2$ of the trailing edge of the slug. The effective radii $R_1$ and $R_2$ are measured along the same radial from the injection means. Thus, the pressure drop can be expressed by the equation:

$$\Delta P_s = C(\mu_s)\left[\ln\left(\frac{R_1}{R_2}\right)\right] \quad (3)$$

where C is a constant of proportionality.

As the slug is moved away from the injection well by the driving fluid, the ratio $(R_1/R_2)$ begins to approach unity, the logarithm of the ratio $(R_1/R_2)$ begins to approach zero and, accordingly, the pressure drop caused by the slug of aqueous solution approaches zero. Consequently, as a slug of aqueous solution is advanced through the formation from the injection means to the production means, the injection pressure required to maintain a desired darcy velocity is less than when the entire body of injected fluid is the aqueous solution.

The use of a slug from the standpoint of reducing the pressure requirements to maintain a desired darcy velocity is particularly of value where a high viscosity is required in the aqueous solution in order to obtain a favorable mobility ratio, i.e., no greater than 1, of the aqueous solution to the oil. This is especially the case in shallow formations.

It is preferred, where a slug of the aqueous solution is employed, to employ only one slug. However, under certain circumstances, particularly where, as mentioned above, high viscosities are required to obtain a desired mobility ratio, a plurality of slugs of the aqueous solution can be employed. Where a plurality of slugs are employed, it is preferred that at least one have a size such that it will flow through the formation from the injection means to the production means without being completely dissipated. Thus, at least one slug will have a volume equivalent to at least 1 percent pore volume. On the other hand, the volume may comprise about 5 percent pore volume of the formation or higher. The total volume of the plurality of slugs need not be greater than about 20 percent pore volume of the formation.

Where a plurality of slugs of aqueous solution are employed, a driving fluid is injected into the formation between each of the slugs. The volume of driving fluid employed between each slug of aqueous solution may be as desired. However, it is preferred that the volume of driving fluid between slugs of aqueous solution be at least 5 percent pore volume.

Any of the materials which have heretofore been used in waterfloods to increase the viscosity of a flooding water may be employed to increase the viscosity of the aqueous solution. These materials include synthetic and naturally occurring compounds and polymers. For example, natural gums such as gum tragacanth, soaps, cellulose esters such as carboxymethylhydroxyethyl cellulose, partially hydrolyzed polyacrylamides, and polystyrene sulfonates may be employed.

Similarly, any of the materials which have heretofore been used as surfactants in a flooding water may be employed to decrease the interfacial tension between the aqueous solution and the oil in the formation. These surfactants include anionic surfactants, cationic surfactants, and nonionic surfactants. For example, sodium dialkyl sulfosuccinates, alkyl aryl sulfonates, and polyoxyethylated alkyl aryl alcohols may be employed.

An aqueous solution suitable for use in the invention contains oleate-type soaps in an amount sufficient to form a shear hardening solution, from 0.01 to 5.0 percent by weight of a nonionic surfactant, and from 0.01 to 1.0 percent by weight of a soluble phosphate such as sodium pyrophosphate as an inorganic builder. Illustrative of the oleate-type soaps in an amount sufficient to form shear hardening solutions is a substituted ammonium oleate in a concentration of from 0.1 to 1.0 percent by weight. Illustrative of the nonionic surfactants is polyethenoxylated nonyl phenol having an average of from 4 to 10 mols of ethylene oxide associated therewith.

Other suitable aqueous solutions include solutions containing the oleate-type soaps in an amount sufficient to form shear hardening solutions, the nonionic surfactants in the amount from 0.01 to 5.0 percent by weight, and from 0.01 to 1.0 percent by weight of an alkyl aryl sulfonate. Illustrative of the alky aryl sulfonates is the alkyl aryl sodium sulfonate detergent available commercially from Monsanto Chemical Company under the trade name of "Santomerse No. 1." Santomerse No. 1 is essentially 59 percent by weight inorganic salts, 40 percent by weight dodecyl benzene sodium sulfonate, and 1 percent by weight other compounds.

Other suitable aqueous solutions include solutions containing from 0.2 to 1.0 percent by weight of ammonium hydroxide, from 0.1 to 1.0 percent by weight of oleic acid, ammonium chloride in excess of 0.05 percent by weight, and a nonionic surfactant such as polyethenoxylated nonyl phenol having an average of from 4 to 10 mols, inclusive, of ethylene oxide associated therewith.

Other suitable aqueous solutions include solutions containing from 0.1 to 1.5 percent by weight of sodium di (2-ethylhexyl) sulfosuccinate, from 0.01 to 1.5 percent by weight of a nonionic surfactant such as polyethenoxylated nonyl phenol having an average of from 4 to 10 mols, inclusive, of ethylene oxide associated therewith, and from 0.13 to 2.0 percent by weight of an inorganic salt such as sodium chloride.

While the method of the invention is beneficial in improving the recovery of oil from any oil-containing subterranean formation, it is more effective where the oil-containing subterranean formation is preferentially water wettable. By water wettable is meant a contact angle $\alpha$, as shown in FIGURE 3, of less than 90 degrees measured through the water phase made by the interface between the water and the oil with the solid surface of the formation. To obtain the best results in those subterranean formations which are preferentially oil wettable, i.e., where the contact angle $\alpha$ is greater than 90 degrees, it is preferred to convert the preferential wettability such that the formation is rendered preferentially water wettable before employing the method of the invention.

Any of the known methods of converting a subterranean formation from a preferentially oil-wettable state to a preferentially water-wettable state may be employed. One such previously published procedure is described in U.S. Patent 3,028,912 by V. J. Berry, Jr. et al.

The invention may be carried out in connection with any of the well arrangements conventionally employed in producing oil from a formation employing a flooding fluid. Thus, the invention may be carried out employing a well pattern in which the flooding fluid is injected into a central well and the oil produced from wells surrounding the central well or vice versa. For example, the invention may be carried out employing a five-spot, or a seven-spot, well pattern. Additionally, the invention may be carried out employing a well pattern wherein the displacing fluid is injected simultaneously into a plurality of wells arranged in a line and produced from a plurality of wells arranged along a parallel line or lines, i.e., wherein a line drive is attained.

Referring to FIGURE 1, there is illustrated a five-spot well pattern. An injection well 10 is surrounded by four production wells 12, 14, 16, and 18. The aqueous solution is injected into well 10 in the desired amount to form, in the preferred mode of carrying out the invention, a slug 20. The slug 20 initially formed is shown in position A. The aqueous solution is injected into well 10 at a rate such that the darcy velocity of the aqueous solution in the subterranean formation is high enough to achieve the desired displacing number. The aqueous solution is driven through the subterranean formation by driving fluid injected into the injection well 10. The rate of injection of the driving fluid is such that the aqueous solution has the desired displacing number.

With continued injection of driving fluid, the slug of aqueous solution advances through the formation. The slug intermediate the injection well and the production well, is shown in position B. At some such intermediate position, e.g., as indicated hereinbefore, when the floodfront of aqueous solution has advanced from about 45 percent to about 65 percent of the distance from the injection means to the production means, the minimum darcy velocity is experienced even though injection is continued at the maximum permissible rate. It is during this interval that the greatest volume of oil is recovered per unit distance of advance of the aqueous solution through the subterranean formation. Hence, it is particularly desirable to maintain during this interval the high displacing numbers, i.e., the product of darcy velocity $V_s$, as calculated from (1) the rate of injection at the surface of the driving fluid and (2) the area A for the position of the front of the aqueous solution, and the previously determined viscosity $\mu_s$ of the aqueous solution, divided by the previously determined interfacial tension $\sigma_{o-s}$ between the aqueous solution and the in-situ oil.

The darcy velocity then begins to increase slightly because the influence of the pressure gradient toward the production means causes a distortion of the expanding cylindrical development. The velocity achieves a high value again in the vicinity of the production means where the pressure gradient and distortion are severe. Such a position of the slug of aqueous solution is illustrated at position C. Although, desirably, the slug of aqueous solution has retained its continuity, it is appreciably thinner at position C than at position B. At position C, the aqueous solution will have been flowed through substantially the entire distance along the paths of flow from the injection means to the production means.

Thus, employing suitably high displacing number, there is realized (1) the high microscopic sweep efficiency approaching that of a miscible fluid injection recovery process, (2) the relatively high macroscopic sweep efficiency of a waterflood, and (3) the lowered fingering and lessened degree of premature breakthrough of flooding water having increased viscosity.

A recovery process employing a line drive is illustrated in FIGURE 2. The slugs of aqueous solution 20 are injected through injection wells 22, 24, 26, and 28. The developmental pattern is substantially the same as previously described in connection with FIGURE 1 until the front of the slugs of aqueous solution meets. Thereafter, as shown in position D, the development is more nearly linear with a relatively constant area, than cylindrical with an expanding area. Hence, after the joinder of the slugs of aqueous solution, higher darcy velocities are achievable employing a line drive pattern than with a pattern employing a single injection well.

The following examples will be further illustrative of the invention. In these examples, the amount of oil that could be removed from various core samples by flooding the core samples with water was first determined. Thereafter, the additional amount of oil that could be removed from the core samples by flooding the core samples with an aqueous solution under such conditions that its displacing number was at least $2 \times 10^{-5}$ was determined. In each example, the procedure followed was substantially the same. Where, however, there were differences in the procedure, the differences are described.

In each example, a core sample having some striations therein was employed to simulate the subterranean formation. The core samples were Berea sandstone cores selected to have porosities and permeabilities within as narrow a range as practical. The gas permeabilities were $600 \pm 60$ millidarcies, and the porosities ranged from 0.216 to 0.226. The core samples had a length of $31 \mp 0.07$ centimeters, an area of $19.45 \pm 0.14$ square centimeters, and a pore volume of $132.87 \pm 3.67$ cubic centimeters. Each core sample was stabilized beforehand by being treated with a sodium carbonate flux and thereafter fired to 1300° C. so that their properties from a chemical standpoint would be substantially uniform.

In carrying out the examples, each core sample was put into a Hassler cell with a 250-pound sleeve pressure applied and the cell placed in a box where the temperature was controlled at $25 \mp 0.1°$ C. First, each core sample was flushed to equilibrium conditions with carbon dioxide and then saturated with water by flowing the water through the sample. The water employed was distilled water except in Example 3 where the water contained 1.4 percent by weight of sodium chloride. Water flow was continued through the core sample until an equilibrium pressure differential was obtained. From this rate of flow at this pressure differential, the liquid permeability was calculated employing Darcy's law. An oil phase, i.e., hexadecane, was introduced into each core sample by capillary desaturation at a pressure of 65 centimeters of mercury, the water displaced by the oil being measured in a burette to determine the oil saturation. For each core sample, the oil saturation was $77 \pm 1$ percent. Next, a simulated waterflood was carried out on each core sample.

In the simulated waterflood, water was passed through the core sample at a measured flow rate, pressure, and volume. The water employed was distilled water except in Example 3 where the water, similarly to the water employed for a saturating the core sample, contained 1.4 percent by weight of sodium chloride. The flow rate was controlled with a positive displacement Ruska pump, a pump rate of 1 cubic centimeter per hour being equivalent to an approximate darcy velocity of $1.42 \times 10^{-5}$ centimeters per second. The water was flowed through the core sample until no more oil was produced at the flow rate employed. The cumulative volume of oil removed from the sample by the water was measured.

Following the passage of the water through the core sample, a slug of aqueous solution containing a thickening agent and a surfactant was passed through each of the core samples at measured flow rates, at measured pressures, and in measured volumes. The flow rates were controlled similarly as described above in connection with the water. These flow rates were maintained constant except in a few instances where the pressure required to maintain the flow rates constant was in excess of the pressure limits of the apparatus. The aqueous solution was flowed through each core sample until no more oil was being produced at the flow rate employed. The cumulative volume of oil removed from each sample by the aqueous solution was measured.

The data are summarized in the table. In the table, the data for the simulated waterflood employing distilled water was substantially similar for each core sample and therefore, to avoid unnecessary duplication, are set forth only one time under the heading "Standard-Distilled Water." The data for the simulated waterflood employing water containing sodium chloride are given under the heading "Standard-Salt Water." Further, in the table, the recovery is given as the total amount of oil, expressed on the basis of percent of the amount of oil in the core sample prior to the simulated waterflood, removed from the core sample by both the simulated waterflood and by the aqueous solution. The viscosity of the aqueous solution is that determined from the pressure drop through the core sample employing Darcy's law. The interfacial tension is that obtained by measurements employing the modified sessile drop method. The fluid volume is the amount, expressed in terms of the pore volume of the core sample, of the water employed in the simulated waterflood, under the two standards, or of the aqueous solution employed in further flooding, under each of the example numbers. The darcy velocity is that determined from the rate at which the water or aqueous solution was pumped.

*Example 1*

In this example, the flooding liquid employed was a shear hardening solution consisting of 0.52 percent by weight of ammonium hydroxide, 0.15 percent by weight of oleic acid, 0.05 percent by weight of ammonium chloride, and the remainder water.

*Example 2*

The flooding liquid employed in this example was similar to that employed in Example 1 except that it contained 5 percent by weight of a surfactant consisting of nonyl phenol adducted with 9 mols of ethylene oxide per mol of nonyl phenol.

*Example 3*

The flooding liquid employed in this example was a shear hardening solution consisting of 0.1 percent by weight of sodium di(2-ethylhexyl) sulfosuccinate, 0.1 percent by weight of a surfactant consisting of nonyl phenol adducted with 6 mols of ethylene oxide per mol of nonyl phenol, 1.4 percent by weight of sodium chloride, and the remainder water.

*Example 4*

The flooding liquid employed in this example was a shear hardening solution consisting of 0.07 percent by weight of sec-butylamine oleate, 0.027 percent by weight of ethylamine hydrochloride, and the remainder water. The solution had a pH of about 10.2.

*Example 5*

In this example, the same flooding liquid was employed as in Example 4. However, the flow rate in this example was twice that in Example 4.

*Examples 6–10*

The flooding liquid employed in these examples was a shear hardening solution consisting of 0.4 percent by weight of sodium di(2-ethylhexyl) sulfosuccinate, 0.05 percent by weight of a surfactant consisting of nonyl phenol adducted with 4 mols of ethylene oxide per mol of nonyl phenol, 0.75 percent by weight of sodium chloride, and the remainder water.

The flow rates employed were 17.5, 160, 280, 400, and 560 cubic centimeters per hour for each of Examples 6, 7, 8, 9, and 10, respectively.

In Example 10, for the final rate, i.e., 560 cubic centimeters per hour, approximately 89.2 percent of the oil had been recovered from the core after 1.7 pore volumes of the flooding liquid had been flowed through the core sample. The flooding liquid was allowed to stand in the core sample for two days. A subsequent throughput of 1.3 pore volumes at 560 cubic centimeters per hour increased the total recovery to 95.6 percent of the oil originally in the core sample. The flooding liquid was then allowed to remain in the core sample overnight. Another pore volume of flooding liquid was flowed through the core sample at 560 cubic centimeters per hour. The total oil recovery increased to 96.0 percent of the oil originally in the core sample.

TABLE

| Identification | Standard-Distilled Water | Standard-Salt Water | Example 1 | Example 2 |
|---|---|---|---|---|
| Rate, cc./hr | 5.41 | 5.41 | 560 | 560 |
| Darcy Velocity, cm./sec | $7.66 \times 10^{-5}$ | $1.42 \times 10^{-4}$ | $7.95 \times 10^{-3}$ | $7.95 \times 10^{-3}$ |
| Viscosity, cp | 0.8911 | 1.0 | 3.17 | 1.4 |
| Interfacial Tension, dynes/cm | 27.5 | 32.5 | 1.4 | 0.7 |
| Fluid Volume, $V_p$ | 1.5 | 1.5 | 1.5 | 1.9 |
| Displacing Number | $2.5 \times 10^{-8}$ | $5.2 \times 10^{-8}$ | $1.8 \times 10^{-4}$ | $1.6 \times 10^{-4}$ |
| Recovery, percent | 39.4 | 34.2 | 61.1 | 71.0 |

| Identification | Example 3 | Example 4 | Example 5 | Example 6 |
|---|---|---|---|---|
| Rate, cc./hr | 560 | 280 | 570 | 17.5 |
| Darcy Velocity, cm./sec | $7.95 \times 10^{-3}$ | $3.98 \times 10^{-3}$ | $7.95 \times 10^{-3}$ | $2.4 \times 10^{-4}$ |
| Viscosity, cp | 1.0 | 1.0 | 1.0 | 3.64 |
| Interfacial Tension, dynes/cm | 0.084 | 0.9 | 0.9 | 0.11 |
| Fluid Volume, $V_p$ | 1.5 | 1.5 | 1.5 | 1.5 |
| Displacing Number | $9.5 \times 10^{-4}$ | $4.4 \times 10^{-5}$ | $8.9 \times 10^{-5}$ | $8.3 \times 10^{-5}$ |
| Recovery, percent | 84.8 | 55.5 | 68.4 | 56.4 |

| Identification | Example 7 | Example 8 | Example 9 | Example 10 |
|---|---|---|---|---|
| Rate, cc./hr | 160 | 280 | 400 | 560 |
| Darcy Velocity, cm./sec | $2.27 \times 10^{-3}$ | $3.98 \times 10^{-3}$ | $5.67 \times 10^{-3}$ | $7.95 \times 10^{-3}$ |
| Viscosity, cp | 3.64 | 3.64 | 3.64 | 3.64 |
| Interfacial Tension, dynes/cm | 0.11 | 0.11 | 0.11 | 0.11 |
| Fluid Volume, $V_p$ | 1.5 | 1.5 | 1.5 | 1.7 (3.0–4.0) |
| Displacing Number | $7.5 \times 10^{-4}$ | $1.3 \times 10^{-3}$ | $1.9 \times 10^{-3}$ | $2.7 \times 10^{-3}$ |
| Recovery, percent | 71.1 | 81.6 | 86.7 | 89.2 (95.6–96.0) |

Having thus described my invention, it will be understood that such description has been given by way of example and illustration and not by way of limitation, reference being had to the appended claims for the latter purpose.

What is claimed is:

1. In a method of recovering oil from an oil-containing subterranean formation wherein flooding water is injected through at least one inejction well into said formation, and oil is produced from at least one production well completed therein, the improvement comprising injecting through said injection wells into and flowing within said formation a selected aqueous solution under conditions such that its dimensionless displacing number is at least $2 \times 10^{-5}$ during flow through a significant portion of said formation, said displacing number being defined as:

$$\mu_s V_s / \sigma_{o-s}$$

where:

$\mu_s$ is the viscosity of said aqueous solution, $V_s$ is the darcy velocity of said aqueous solution, and $\sigma_{o-s}$ is the interfacial tension between said aqueous solution and oil it contacts within said formation.

2. The method of claim 1 wherein said dimensionless displacing number is at least $3 \times 10^{-3}$.

3. The method of claim 1 wherein said aqueous solution has a viscosity such that its mobility in said subterranean formation is no greater than the mobility of said oil in said subterranean formation.

4. The method of claim 3 wherein said aqueous solution contains a surfactant.

5. The method of claim 1 wherein said aqueous solution has a viscosity $\mu_s$ and an interfacial tension with in-situ oil $\sigma_{o-s}$ such that the ratio $\mu_s/\sigma_{o-s}$ in seconds per centimeter is at least 0.057.

6. The method of claim 5 wherein said aqueous solution has properties such that said ratio $\mu_s/\sigma_{o-s}$ is greater than about 8.5.

7. The method of claim 1 wherein said aqueous solution is a shear hardening liquid.

8. The method of claim 7 wherein said aqueous solution is a shear hardening liquid containing a surfactant.

9. The method of claim 8 wherein said aqueous solution is a liquid which contains a surfactant and which develops a viscosity under said conditions of flow in said subterranean formation such that its mobility in said subterranean formation is no greater than the mobility of said oil in said subterranean formation.

10. The method of claim 1 wherein said aqueous solution is in a slug of from 1.0 to 100 percent pore volume of said formation.

11. The method of claim 10 wherein said slug of aqueous solution is in an amount of from 1.0 to 20 percent of said pore volume.

12. The method of claim 11 wherein said slug of aqueous solution is in an amount of about 5 percent of said pore volume.

13. In a method of recovering oil from an oil-containing subterranean formation wherein flooding water is injected through at least one injection well into said formation, and oil is produced from said formation through at least one production well completed therein, the improvement comprising the steps of:

(a) injecting into said injection well at least one slug of aqueous solution of from 1 to 20 percent pore volume of said formation under conditions such that its dimensionless displacing number is at least $2 \times 10^{-5}$ in said subterranean formation; and (b) injecting into said injection well at least one slug of at least 5 percent pore volume of said formation of an aqueous driving liquid, said driving liquid being injected at a rate sufficiently great to flow said aqueous solution of Step (a) in said subterranean formation under conditions such that said dimensionless displacing number of said aqueous solution is at least $2 \times 10^{-5}$ during said flow, said displacing number being defined as:

$$\mu_s V_s / \sigma_{o-s}$$

where:

$\mu_s$ is the viscosity of said aqueous solution, $V_s$ is the darcy velocity of said aqueous solution, and $\sigma_{o-s}$ is the interfacial tension between said aqueous solution and oil it contacts within said formation.

14. The method of claim 13 wherein said displacing number is at least $3 \times 10^{-3}$.

15. The method of claim 13 wherein more than one slug of said aqueous solution are injected into said injection well.

16. The method of claim 13 wherein more than one slug of said aqueous driving liquid are injected into said injection well.

17. The method of claim 13 wherein more than one slug of said aqueous solution, and more than one slug of said aqueous driving liquid are injected into said injection well.

18. The method of claim 13 wherein said at least one slug of said aqueous solution, and said at least one slug of said aqueous driving liquid are injected alternately and respectively into said injection well.

19. A method of recovering oil from an oil-containing subterranean formation which comprises the steps of:

(a) completing at least one injection well in said formation;

(b) completing at least one production well in said formation;

(c) selecting a range of darcy velocities which are achievable in waterflooding said subterranean formation between said injection well and said production well;

(d) selecting as a flooding liquid an aqueous solution which, when flowed at said darcy velocities within said selected range, will enable achieving a displacing number of at least $2 \times 10^{-5}$ throughout a significant portion of said subterranean formation between said injection well and said production well;

(e) injecting a slug of from 1 to 20 percent pore volume of said selected aqueous solution through said injection well into said subterranean formation at a velocity such that a displacing number of at least $2 \times 10^{-5}$ is achieved in said subterranean formation;

(f) injecting through said injection well into said formation an aqueous driving liquid at a rate sufficiently great to flow said slug of said aqueous solution in a significant portion of said subterranean formation under conditions such that said dimensionless displacing number of said aqueous solution is at least $2 \times 10^{-5}$ during said flow, said displacing number being defined as:

$$\mu_s V_s / \sigma_{o-s}$$

where:

$\mu_s$ is the viscosity of said aqueous solution, $V_s$ is the darcy velocity of said aqueous solution, and $\sigma_{o-s}$ is the interfacial tension between said aqueous solution and oil it contacts within said formation; and (g) producing oil from said subterranean formation through said production well.

20. The method of claim 19 wherein said displacing number is at least $3 \times 10^{-3}$ throughout a significant portion of said subterranean formation.

References Cited

UNITED STATES PATENTS

| | | | |
|---|---|---|---|
| 2,341,500 | 2/1944 | Detling | 166—9 |
| 2,800,962 | 7/1957 | Garst | 166—9 |
| 2,827,964 | 3/1958 | Sandiford et al. | 166—9 |
| 2,920,041 | 1/1960 | Meadors | 166—9 X |
| 3,100,524 | 8/1963 | Beeson | 166—9 |
| 3,163,212 | 12/1964 | Bernard | 166—9 |
| 3,096,820 | 7/1963 | Bernard | 166—9 |
| 3,208,518 | 9/1965 | Patton | 166—9 |
| 3,292,698 | 12/1966 | Savins | 166—9 |
| 3,302,712 | 2/1967 | Townsend et al. | 166—9 |
| 3,292,697 | 12/1966 | Abdo et al. | 166—9 |

STEPHEN J. NOVOSAD, *Primary Examiner.*

UNITED STATES PATENT OFFICE
CERTIFICATE OF CORRECTION

Patent No. 3,362,473                                January 9, 1968

William R. Foster

It is hereby certified that error appears in the above numbered patent requiring correction and that the said Letters Patent should read as corrected below.

Column 10, lines 49 and 50, for "employedfor a" read -- employed for --; column 12, in the table, under the heading "Example 5", line 1 thereof, for "570" read -- 560 --; column 13, line 1, for "inejction" read -- injection --; line 4, for "wells" read -- well --; line 25, before "in-" insert -- the --.

Signed and sealed this 18th day of February 1969.

(SEAL)
Attest:

Edward M. Fletcher, Jr.                                EDWARD J. BRENNER
Attesting Officer                                          Commissioner of Patents